US 11,536,299 B2

(12) United States Patent
Lippett

(10) Patent No.: US 11,536,299 B2
(45) Date of Patent: Dec. 27, 2022

(54) METHODS AND HYDRAULIC APPARATUS

(71) Applicant: Jack Kevin Lippett, Bassett, VA (US)

(72) Inventor: Jack Kevin Lippett, Bassett, VA (US)

( * ) Notice: Subject to any disclaimer, the term of this patent is extended or adjusted under 35 U.S.C. 154(b) by 247 days.

(21) Appl. No.: 17/039,534

(22) Filed: Sep. 30, 2020

(65) Prior Publication Data
US 2022/0099113 A1    Mar. 31, 2022

(51) Int. Cl.
*F15B 21/10* (2006.01)
*F16K 15/18* (2006.01)
*F15B 1/00* (2006.01)
*E02F 9/22* (2006.01)

(52) U.S. Cl.
CPC .......... *F15B 21/10* (2013.01); *F16K 15/1826* (2021.08); *E02F 9/2217* (2013.01); *F15B 1/00* (2013.01); *F15B 2211/329* (2013.01); *F16D 2500/7041* (2013.01)

(58) Field of Classification Search
CPC .......... F15B 2211/212; F15B 2211/428; F15B 2211/625; F15B 21/10; F15B 11/20; F15B 2211/41527; A01G 23/091
See application file for complete search history.

(56) References Cited

U.S. PATENT DOCUMENTS

| 3,610,302 | A | * | 10/1971 | McColl | A01G 23/08 144/34.5 |
| 5,293,914 | A | * | 3/1994 | Hudson | B27L 1/00 91/468 |
| 5,494,075 | A | | 2/1996 | Moore | |
| 9,133,983 | B2 | * | 9/2015 | Kettunen | F16N 7/38 |
| 9,683,669 | B2 | | 6/2017 | Luthi et al. | |
| 2013/0248294 | A1 | * | 9/2013 | Kettunen | B27B 17/12 184/26 |
| 2015/0289456 | A1 | * | 10/2015 | Cudoc | A01G 23/097 144/24.13 |
| 2020/0298998 | A1 | * | 9/2020 | Rieser | B64F 1/227 |

FOREIGN PATENT DOCUMENTS

| DE | 102017201064 | A1 | * | 7/2018 | | |
| EP | 3097772 | A1 | * | 11/2016 | ........... | A01G 23/081 |
| EP | 3984354 | A1 | * | 4/2022 | | |
| WO | WO-2017158163 | A1 | * | 9/2017 | ............. | B64F 1/227 |

* cited by examiner

*Primary Examiner* — Thomas E Lazo
(74) *Attorney, Agent, or Firm* — Wentsler LLC

(57) ABSTRACT

Methods can comprise charging a first hydraulic device of a first hydraulic circuit with a first quantity of hydraulic fluid from a hydraulic fluid source. The methods can further comprise pressurizing a control segment and locking the first quantity of hydraulic fluid from exiting the first hydraulic circuit in response to hydraulic pressure within the control segment. The methods can also include unlocking the first quantity of hydraulic fluid to permit exiting of the first quantity of hydraulic fluid from the first hydraulic device in response to dropping the hydraulic pressure within the control segment after a delay. Hydraulic apparatus can comprise a normally open hydraulic pilot operated control valve that can be configured to hydraulically lock a first hydraulic device in response to a hydraulic pressure within a control segment rising to greater than or equal to an actuation pressure.

20 Claims, 12 Drawing Sheets

METHODS AND HYDRAULIC APPARATUS

FIELD

The present disclosure relates generally to methods and hydraulic apparatus and, more particularly, to methods including a hydraulically activated delay and hydraulic apparatus including a normally open hydraulic pilot operated control valve to provide a hydraulically activated delay.

BACKGROUND

It is known to charge a hydraulic device with hydraulic fluid with a hydraulic fluid source. There is a need to provide a hydraulically activated time delay that reduces or prevents discharging of the hydraulic device once the hydraulic device is no longer in communication with the hydraulic fluid source.

SUMMARY

Some example embodiments of the disclosure are described below with the understanding that any of the embodiments may be used alone or in combination with one another.

In some embodiments, methods of the disclosure can comprise placing a hydraulic fluid source in communication a first hydraulic circuit and charging a first hydraulic device of the first hydraulic circuit with a first quantity of hydraulic fluid from the hydraulic fluid source. The methods can further comprise pressurizing a control segment of the first hydraulic circuit with the hydraulic fluid source to a hydraulic pressure greater than or equal to an actuation pressure. The methods can still further include locking the first quantity of hydraulic fluid from exiting the first hydraulic circuit in response to the hydraulic pressure within the control segment reaching greater than or equal to the actuation pressure. The methods can also include preventing further communication between the hydraulic fluid source and the first hydraulic circuit. Still further, the methods can include unlocking the first quantity of hydraulic fluid to permit exiting of the first quantity of hydraulic fluid from the first hydraulic device in response to dropping the hydraulic pressure within the control segment below the actuation pressure after a delay of about 0.5 seconds or more from the preventing further communication between the hydraulic fluid source and the first hydraulic circuit.

In some embodiments, methods can comprise placing a hydraulic fluid source in communication with a port of a first hydraulic circuit and charging a first hydraulic device of the first hydraulic circuit with a first quantity of hydraulic fluid entering the port from the hydraulic fluid source. The methods can further comprise charging a hydraulic accumulator of the first hydraulic circuit with a second quantity of hydraulic fluid entering the port from the hydraulic fluid source. The methods can further comprise pressurizing a control segment of the first hydraulic circuit with the hydraulic fluid source to a hydraulic pressure greater than or equal to an actuation pressure and locking the first quantity of hydraulic fluid from passing through the port to exit the first hydraulic circuit. The locking can comprise hydraulically closing a normally open hydraulic pilot operated control valve from an open orientation to a closed orientation in response to the hydraulic pressure within the control segment reaching greater than or equal to the actuation pressure. The methods can further comprise removing the hydraulic fluid source from further communication with the port to prevent further hydraulic communication between the hydraulic fluid source and the first hydraulic device and to prevent further hydraulic communication between the hydraulic fluid source and the hydraulic accumulator. The methods can further comprise discharging the second quantity of hydraulic fluid from the hydraulic accumulator over a period of time to maintain the hydraulic pressure within the control segment at greater than or equal to the actuation pressure to maintain the normally open hydraulic pilot operated control valve in the closed orientation to continue locking the first quantity of hydraulic fluid from passing through the port to exit the first hydraulic circuit during the period of time. The methods can further comprise unlocking the first quantity of hydraulic fluid to permit the first quantity of hydraulic fluid to pass though the port and exit the first hydraulic circuit. The unlocking can comprise hydraulically opening a normally open hydraulic pilot operated control valve from a closed orientation to an open orientation in response to the hydraulic pressure within the control segment dropping below the actuation pressure after the period of time.

In some embodiments, a hydraulic apparatus can comprise a control segment and a hydraulic accumulator in communication with the control segment. The hydraulic apparatus can further comprise a first hydraulic device and a normally open hydraulic pilot operated control valve in communication with the control segment. The normally open hydraulic pilot operated control valve can be configured to hydraulically lock the first hydraulic device in response to a hydraulic pressure within the control segment rising to greater than or equal to an actuation pressure.

Additional embodiments disclosed herein will be set forth in the detailed description that follows. It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

BRIEF DESCRIPTION OF THE DRAWINGS

These and other embodiments are better understood when the following detailed description is read with reference to the accompanying drawings, in which.

DETAILED DESCRIPTION

Figure 1:
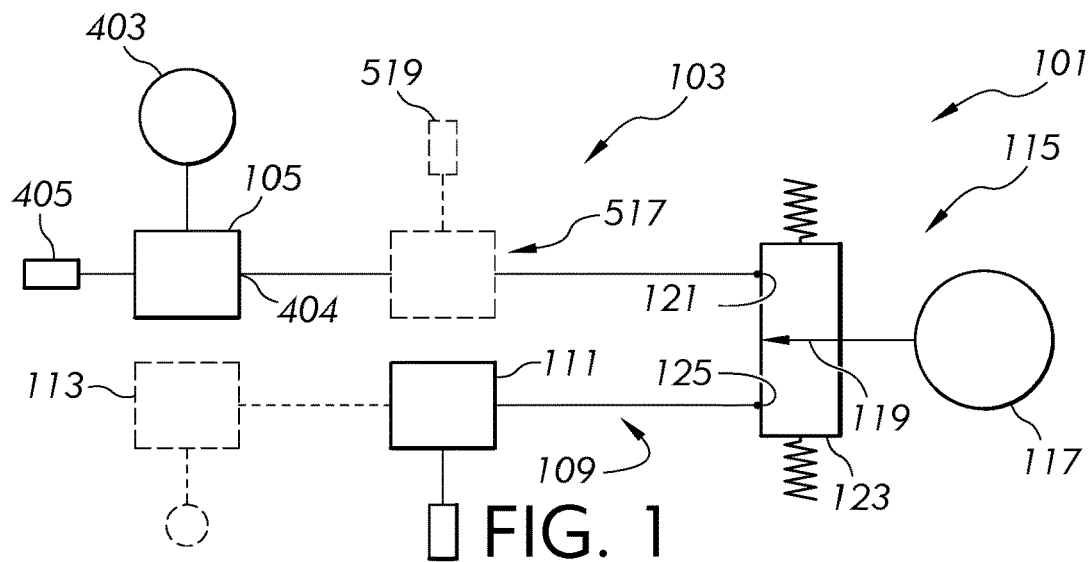
FIG. 1 illustrates a schematic view of an example hydraulic apparatus comprising hydraulic fluid source of fluid that is not in communication with a first hydraulic circuit or a second hydraulic circuit.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 2:
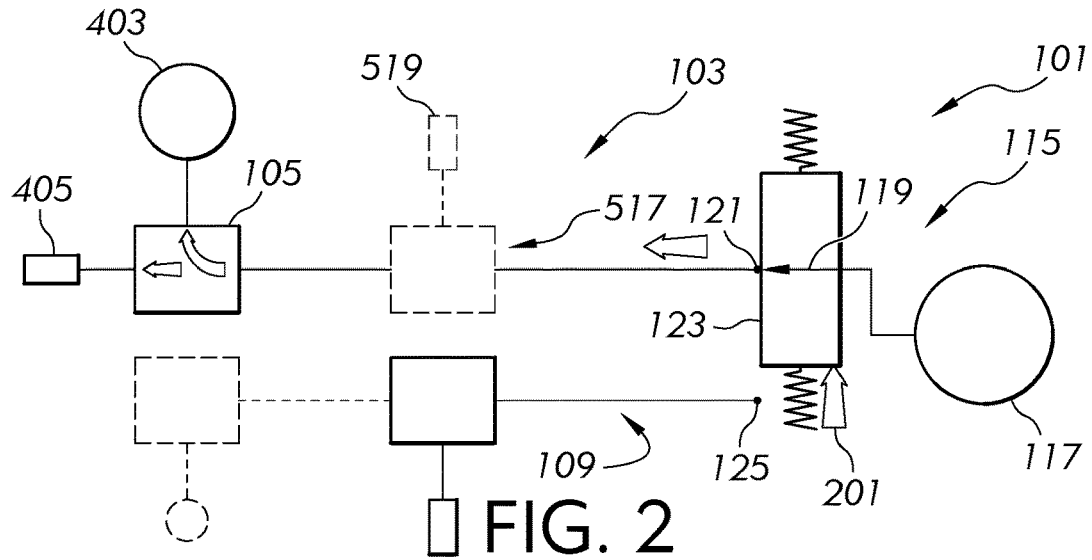
FIG. 2 illustrates a schematic view of the hydraulic apparatus of FIG. 1 with the hydraulic fluid source in communication with the first hydraulic circuit without being in communication with the second hydraulic circuit.
Figure 3:
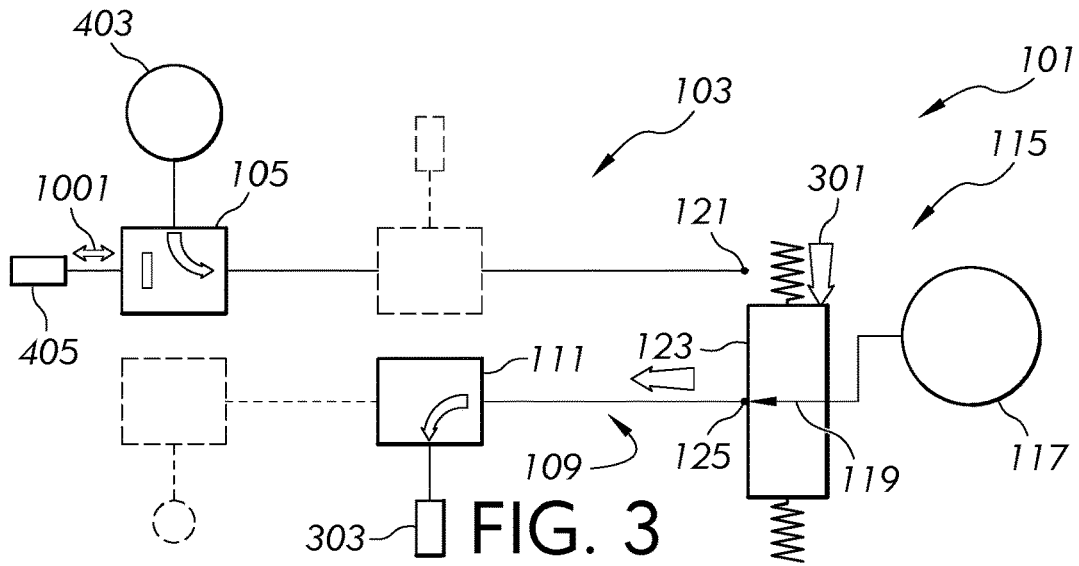
FIG. 3 illustrates a schematic view of the hydraulic apparatus of FIG. 1 with the hydraulic fluid source in communication with the second hydraulic circuit without being in communication with the first hydraulic circuit.

Hydraulic apparatus of the disclosure can comprise one or any number of hydraulic circuits. For example, as shown in FIGS. 1-3, the hydraulic apparatus 101 can comprise a first hydraulic circuit 103. In some embodiments, the hydraulic apparatus 101 can comprise one or more first hydraulic components of the first hydraulic circuit 103 designed to carry out a first hydraulic function. As shown in FIGS. 1-4, the one or more first hydraulic components can optionally be provided in a first hydraulic manifold 105. As further illustrated, additional first hydraulic components may be provided outside of the first manifold. Still further, although not shown, all of the first hydraulic components can be provided within a manifold or without a manifold in further embodiments. In still further embodiments, additional upstream and/or downstream hydraulic components may be provided to carry out a corresponding two or more additional upstream and/or downstream functions. For example, as schematically shown in broken lines in FIG. 1, an optional upstream manifold 107 may provided that is upstream from the first hydraulic manifold 105 to carry out an optional upstream hydraulic function that is upstream from the first hydraulic function.

as shown in FIGS. 1-3, the hydraulic apparatus 101 can optionally comprise a second hydraulic circuit 109. In some embodiments, the hydraulic apparatus 101 can comprise one or more second hydraulic components of the second hydraulic circuit 109 designed to carry out a second hydraulic function. As shown in FIGS. 1-3, the one or more second hydraulic components can optionally be provided in a second hydraulic manifold 111 although further second hydraulic components may be provided outside of the second manifold in further embodiments. Still further, although not shown, the one or more second hydraulic components may be provided without a manifold in further embodiments. In still further embodiments, additional upstream and/or downstream hydraulic components may be provided to carry out a corresponding two or more additional upstream and/or downstream functions with the second hydraulic circuit 109. For example, as schematically shown in broken lines in FIG. 1, an optional downstream manifold 113 of the second hydraulic circuit 109 may provided that is downstream from the second hydraulic manifold 111 to carry out a downstream hydraulic function that is downstream from the second hydraulic function. In some embodiments, the hydraulic apparatus 101 can comprise a grapple that can hydraulically pivot relative to a grapple bracket. In further embodiments, the hydraulic apparatus 101 can comprise a grapple with jaws that can hydraulically open and close. In further embodiments, alternative hydraulic functions may be provided where the grapple is replaced with another mechanical component or components. In still further embodiments, the hydraulic apparatus 101 can be considered the first hydraulic circuit 103 alone or in combination with the second hydraulic circuit 109. In further embodiments, the hydraulic apparatus 101 can be considered one or more components of the first hydraulic circuit 103 alone or in combination with one or more components of the second hydraulic circuit 109.

In some embodiments, the hydraulic apparatus may be considered to include a hydraulic fluid source 115 that can be selectively placed in communication with the first hydraulic circuit 103. As shown in FIGS. 1-3, the hydraulic fluid source 115 may comprise a quantity of hydraulic fluid within a pressure vessel 117 and/or the quantity of hydraulic fluid may be provided by a fluid pump or other fluid storage vessel. The hydraulic fluid source 115 can also comprise a hydraulic communication line 119 that may be selectively placed in communication with a port 121 of the first hydraulic circuit 103. FIG. 1 schematically illustrates a valve 123 of the hydraulic fluid source 115 in a closed orientation wherein the hydraulic communication line 119 of the hydraulic fluid source 115 is not in communication with the port 121 of the first hydraulic circuit 103.

As shown in FIG. 2, in some embodiments, a force 201 may be applied (e.g., manually applied) to move the valve 123 from the closed orientation shown in FIG. 1 to a first open orientation where the hydraulic communication line 119 of the hydraulic fluid source 115 is placed in communication with the port 121 of the first hydraulic circuit 103. In the closed orientation of FIG. 1 and the first open orientation of FIG. 2, the hydraulic fluid source is not in communication with the second hydraulic circuit 109.

In some embodiments, only the first hydraulic circuit 103 may be provided alone or in combination with another hydraulic component not associated with the first hydraulic circuit. For example, embodiments may provide the hydraulic apparatus 101 as only the first hydraulic circuit 103 or a combination of the first hydraulic circuit 103 and the hydraulic fluid source 115. In some embodiments, the valve 123 may only move from the closed orientation shown in FIG. 1 to the first open orientation shown in FIG. 2 without a second open orientation or second hydraulic circuit 109. Alternatively, as shown in FIG. 3, in some embodiments, a force 301 may be applied (e.g., manually applied) to move the valve 123 from the closed orientation shown in FIG. 1 to a second open orientation where the hydraulic communication line 119 of the hydraulic fluid source 115 is placed in communication with a port 125 of the second hydraulic circuit 109. In the closed orientation of FIG. 1 and the second open orientation of FIG. 3, the hydraulic fluid source 115 is not in communication with the first hydraulic circuit 103.

Figure 4:
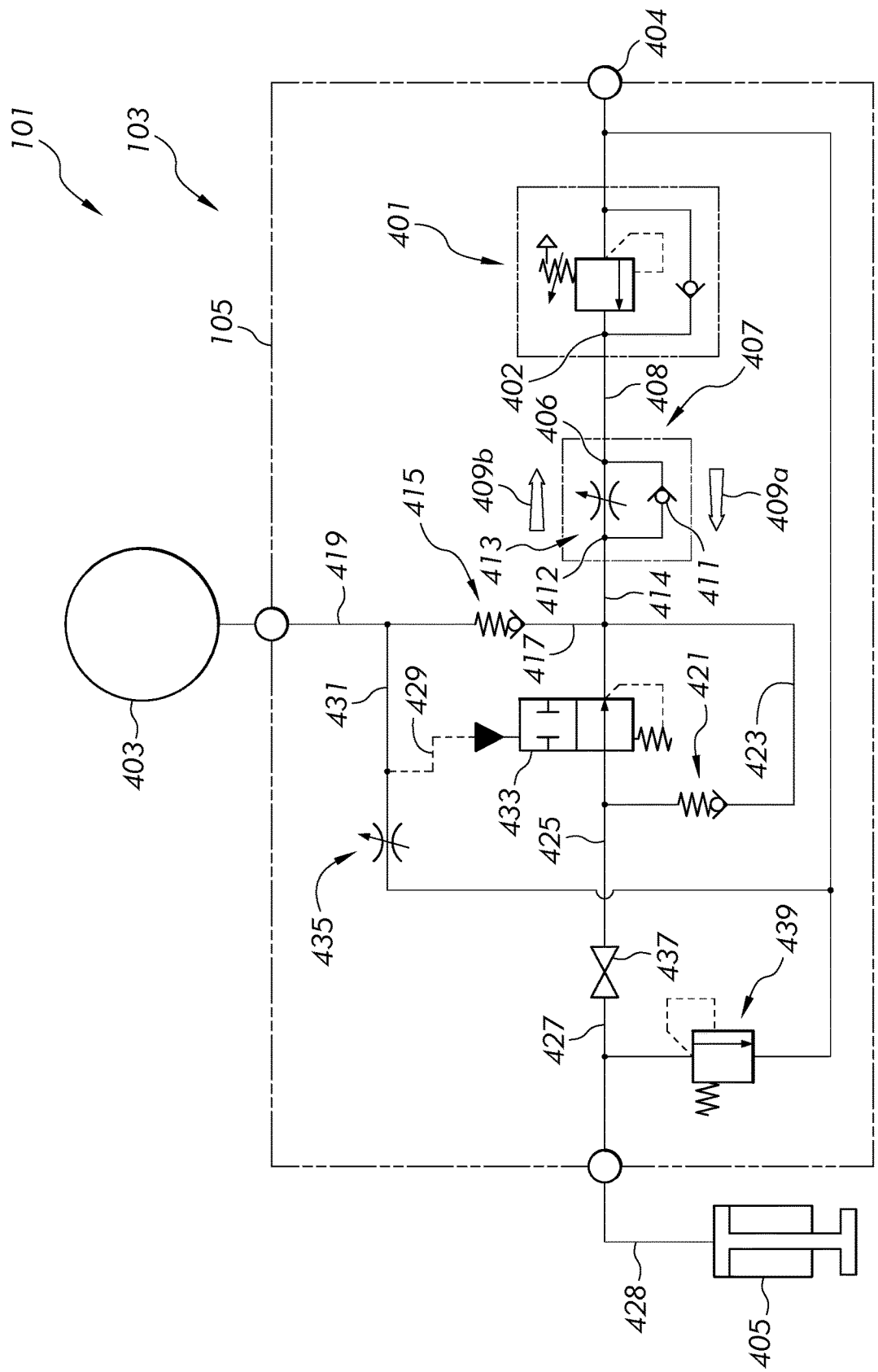
FIG. 4 schematically illustrates an example hydraulic flow schematic of portions of the first hydraulic circuit of embodiments of the disclosure in a first flow orientation.
Figure 6:
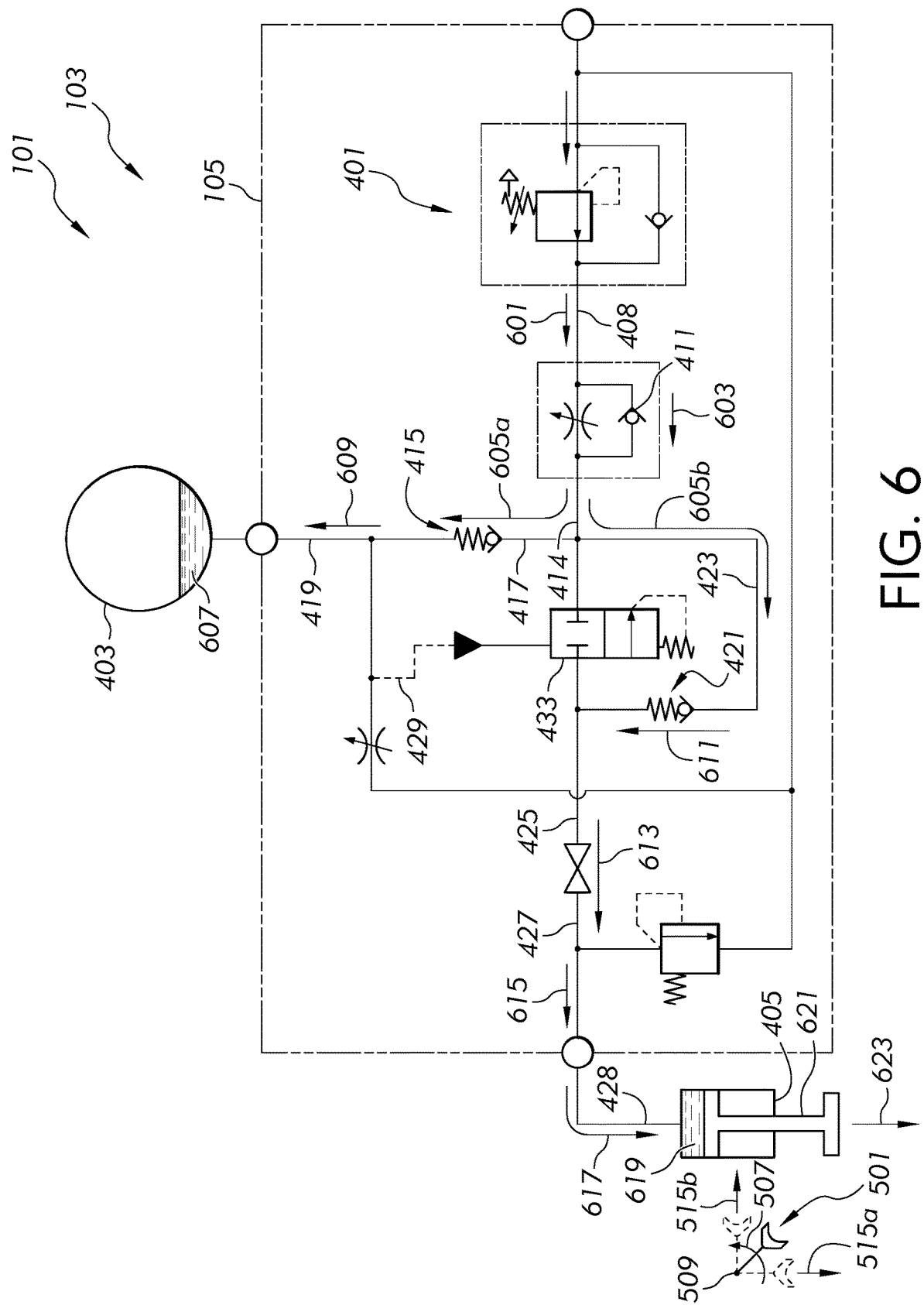
FIG. 6 schematically illustrates the example hydraulic flow schematic of FIG. 4 in a second flow orientation with simultaneous charging of a first hydraulic device and a hydraulic accumulator.

Example first hydraulic components of the first hydraulic circuit 103 will now be discussed with initial reference to FIG. 4. In some embodiments, the first hydraulic circuit 103 may optionally comprise a sequence valve 401 that can prevent hydraulic fluid from charging a hydraulic accumulator 403 or a first hydraulic device 405 with hydraulic fluid until the hydraulic pressure reaches a level high enough to open the sequence valve 401. For example, as shown in FIG. 4, the sequence valve 401 can be biased by a biasing device (e.g., a spring) to a normally closed orientation to prevent passage of hydraulic fluid through the sequence valve 401. Once the hydraulic pressure reaches a level that overcomes the bias of the biasing device of the sequence valve 401, the sequence valve can be moved from the closed orientation shown in FIG. 4 to the open orientation shown in FIG. 6. As shown in FIG. 6, once the sequence valve 401 is moved to the open orientation, hydraulic fluid may pass through the sequence valve 401 for simultaneously charging the hydraulic accumulator 403 or the first hydraulic device 405 with hydraulic fluid The biasing force of the sequence valve (e.g., spring force) can be adjusted to adjust the level of pressure required to move the sequence valve 401 from the closed orientation (see FIG. 4) to the open orientation (see FIG. 6).

Figure 5:
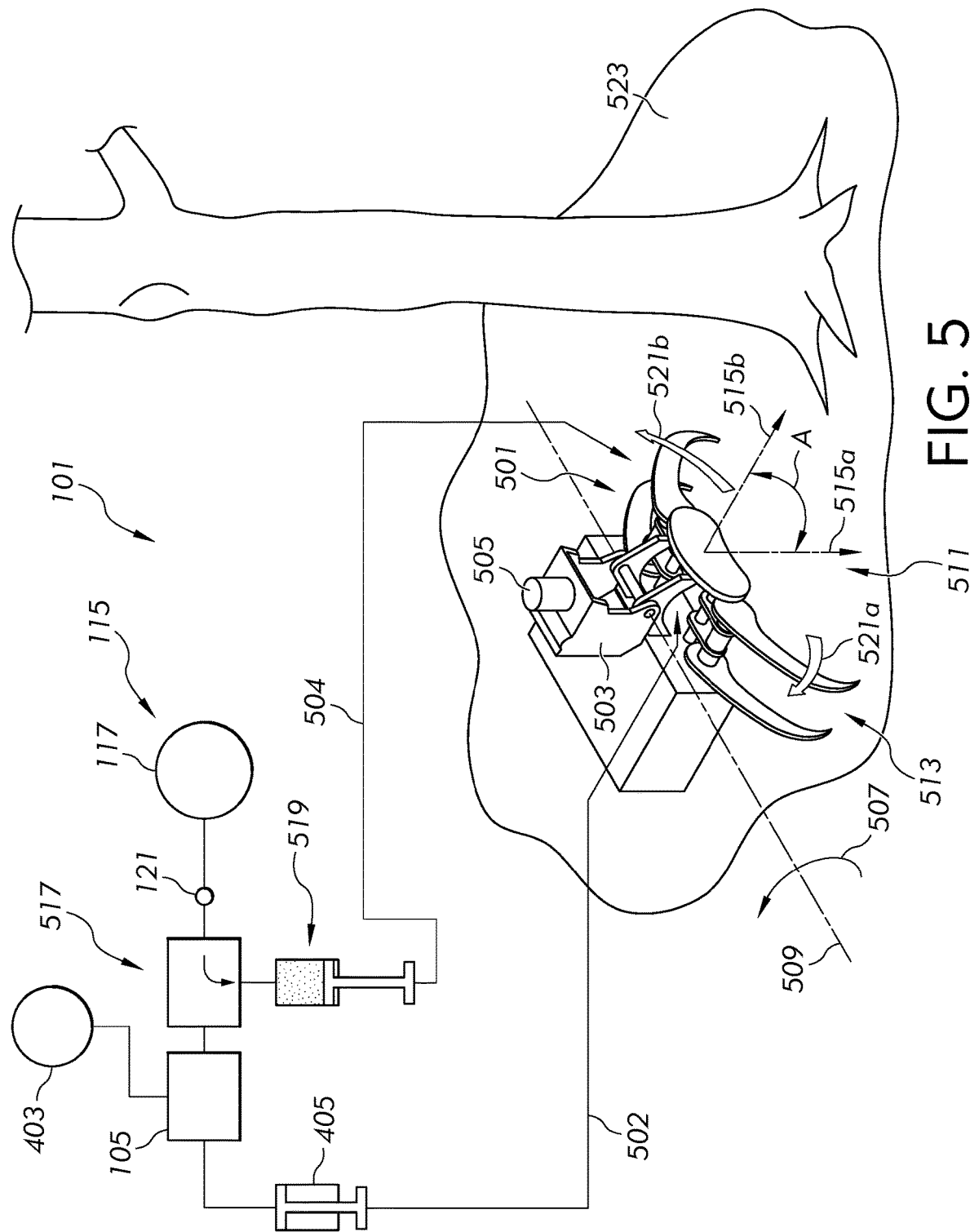
FIG. 5 schematically illustrates an upstream function of the first hydraulic circuit being performed in the first flow orientation.
Figure 8:
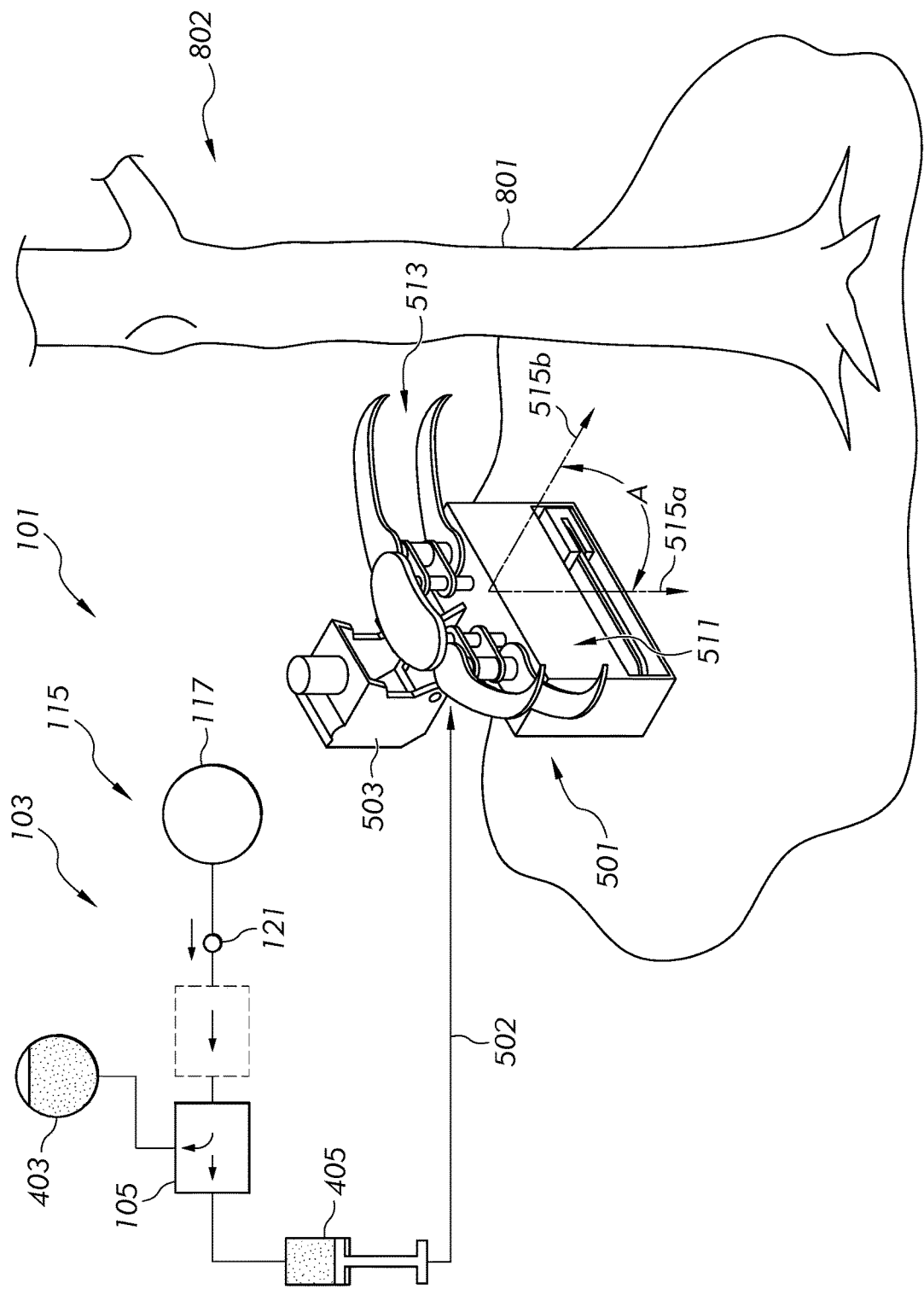
FIG. 8 schematically illustrate a grapple being moved toward a tree trunk of a tree.

As shown in FIGS. 4-5, in some embodiments, the first hydraulic device 405 can comprise a hydraulic actuator although the hydraulic device can comprise a wide range of components such as, but not limited to, a hydraulic pump, a hydraulic motor, a hydraulic tool, or a hydraulic clamp. In the illustrated embodiment, as shown schematically in FIGS. 5 and 8, the first hydraulic device 405 can comprise a hydraulic actuator. As schematically represented by arrow 502, in some embodiments, the first hydraulic device 405 (e.g., first hydraulic actuator) can operate between a grapple 501 and a grapple bracket 503 mounted to an end of a support arm 505 to pivot the grapple 501 relative to the grapple bracket 503 in a pivot direction 507 about a pivot axis 509 from a first position (e.g., see FIG. 5) to a second position (e.g., see FIG. 8). As shown in FIG. 5, in the first position, the grapple 501 can be unbiased wherein an opening 511 into the grapple 501 (e.g., the opening 511 into jaws 513 of the grapple 501) faces a first direction 515a. As shown, in some embodiments, the first direction 515a extends from the opening 511 towards ground although the first direction 515a may extend from the opening 511 towards other underlying objects/structures, e.g., pavement, a body of water, or other foundation. Furthermore, the first direction 515a may extend at an angle relative to the objects/structures. For example, as shown the first direction 515a may extend substantially perpendicular to the ground in some embodiments. In the second position (e.g., see FIG. 8), the opening 511 into the grapple 501 faces a second direction 515b extending at an angle "A" relative to the first direction 515a. In some embodiments, the angle "A" can be from about 40° to about 140°, from about 50° to about 130°, from about 60° to about 120°, from about 70° to about 110°, 80° to about 100°, about 90°, or any ranges or subranges therebetween. In some embodiments, the second direction 515b can extend toward an object to be clamped with the jaws 513, such as a tree trunk 801 of a tree 802

Turning back to FIG. 4, in some embodiments, the first hydraulic circuit 103 can further comprise a flow control device 407. For example, a hydraulic communication line 408 can provide hydraulic communication between an outlet 402 of the sequence valve 401 and an inlet 406 of the flow control device 407. When charging the hydraulic accumulator 403 and the first hydraulic device 405 with hydraulic fluid, hydraulic fluid may flow in charging direction 409a through a check valve 411 of the flow control device 407. When discharging hydraulic fluid from the first hydraulic device 405, hydraulic fluid may flow in discharging direction 409b through a flow control valve 413 to control a discharge rate of hydraulic fluid from the first hydraulic device 405. As shown, the flow control valve 413 can be adjustable to adjust the discharge rate of hydraulic fluid from the first hydraulic device 405.

The first hydraulic circuit 103 can further comprise a check valve 415 that only permits hydraulic fluid flow in one direction through hydraulic communication lines 414, 417, 419 from the outlet 412 of the flow control device 407 to charge the hydraulic accumulator 403. The first hydraulic circuit 103 can further comprise another check valve 421 that only permits hydraulic fluid flow in one direction through hydraulic communication lines 414, 423, 425, 427 and 428 from the outlet 412 of the flow control device 407 to charge the first hydraulic device 405.

The first hydraulic circuit 103 can further comprise a control segment 429. As shown, the control segment can be in communication with the hydraulic accumulator 403, for example, by hydraulic communication lines 419, 431. A normally open hydraulic pilot operated control valve 433 can also be in communication with the control segment 429. The normally open hydraulic pilot operated control valve 433 can be configured to hydraulically lock the first hydraulic device 405 in response to a hydraulic pressure within the control segment 429 rising to greater than or equal to an actuation pressure.

The first hydraulic circuit 103 can further comprise a flow control valve 435 configured to control a discharge rate that hydraulic fluid is discharged from the hydraulic accumulator 403. As shown, in some embodiments, the flow control valve 435 can be adjustable to adjust the discharge rate that the hydraulic fluid is discharged from the hydraulic accumulator 403.

The first hydraulic circuit 103 can further include a shut-off valve 437 such as the illustrated ball valve. The optional shut-off valve 437 can be closed to lock hydraulic fluid within the hydraulic communication lines 427, 428 and the first hydraulic device 405. A pressure release valve 439 can also be provided to prevent over pressurization of hydraulic fluid within the first hydraulic circuit 103. For example, in some embodiments, the pressure release valve 439 can prevent over pressurization within the hydraulic communication lines 427, 428 and the first hydraulic device 405.

Methods will now be described of using the hydraulic apparatus 101 including one or more features described above. In some embodiments, the methods can include placing the hydraulic fluid source 115 in communication with the first hydraulic circuit 103 such that pressurized hydraulic fluid is introduced into the first hydraulic circuit 103. For example, as shown in FIG. 2, in some embodiments, the valve 123 may be moved with the force 201 such that the hydraulic communication line 119 of the hydraulic fluid source 115 is placed in communication with the port 121 of the first hydraulic circuit 103. Pressurized hydraulic fluid within the pressure vessel 117 may then pass through the port 121 of the first hydraulic circuit 103.

Optionally, the hydraulic fluid flowing into the first hydraulic circuit 103 can have an upstream functionality that is carried out before charging the first hydraulic device 405. For example, as shown in FIG. 5, upstream components 517 may direct hydraulic fluid to charge an upstream hydraulic device 519, such as the illustrated upstream hydraulic actuator. As schematically represented by the arrow 504 in FIG. 5, the upstream hydraulic actuator can act to fully open the jaws 513 as shown by arrows 521a, 521b. As shown in FIG. 4, in order to dedicate the hydraulic fluid to performing the upstream functionality (e.g., fully opening the jaws 513), the first hydraulic circuit 103 can include the sequence valve 401 to prevent hydraulic fluid from traveling through a port 404 of the first hydraulic manifold, through the sequence valve 401 and through the hydraulic communication line 408 positioned downstream from the sequence valve 401.

As shown in FIG. 6, once a sufficient hydraulic pressure is applied to the sequence valve 401 (e.g., when the upstream functionality is complete), the sequence valve 401 opens to allow hydraulic fluid to pass through the sequence valve 401 and through the hydraulic communication line 408 as indicated by flow directional the arrow 601. As indicated by flow directional arrow 603, hydraulic fluid can then pass through the check valve 411 to the hydraulic communication line 414.

The hydraulic fluid flow is then split into two hydraulic fluid flows as indicated by the flow directional arrows 605a, 605b. A first hydraulic fluid flow travels through the hydraulic communication lines 417 and the check valve 415 as indicated by a first flow directional arrow 605a and then through the hydraulic communication line 419 and into the hydraulic accumulator 403 to charge the hydraulic accumulator 403 with a second quantity of hydraulic fluid 607 from the hydraulic fluid source 115 as indicated by flow directional arrow 609. When the second quantity of hydraulic fluid 607 begins charging the hydraulic accumulator 403, the control segment 429 of the first hydraulic circuit 103 is pressurized with the hydraulic fluid source 115 to a hydraulic pressure greater than or equal an actuation pressure. A first quantity of hydraulic fluid is locked from exiting the first hydraulic circuit 103 in response to the hydraulic pressure within the control segment 429 reaching greater than or equal to the actuation pressure. For example, in some embodiments, the locking comprises hydraulically closing the normally open hydraulic pilot operated control valve 433 from an open orientation (see FIG. 4) to a closed orientation (see FIG. 6) in response to the hydraulic pressure within the control segment 429 reaching greater than or equal to the actuation pressure.

Figure 7:
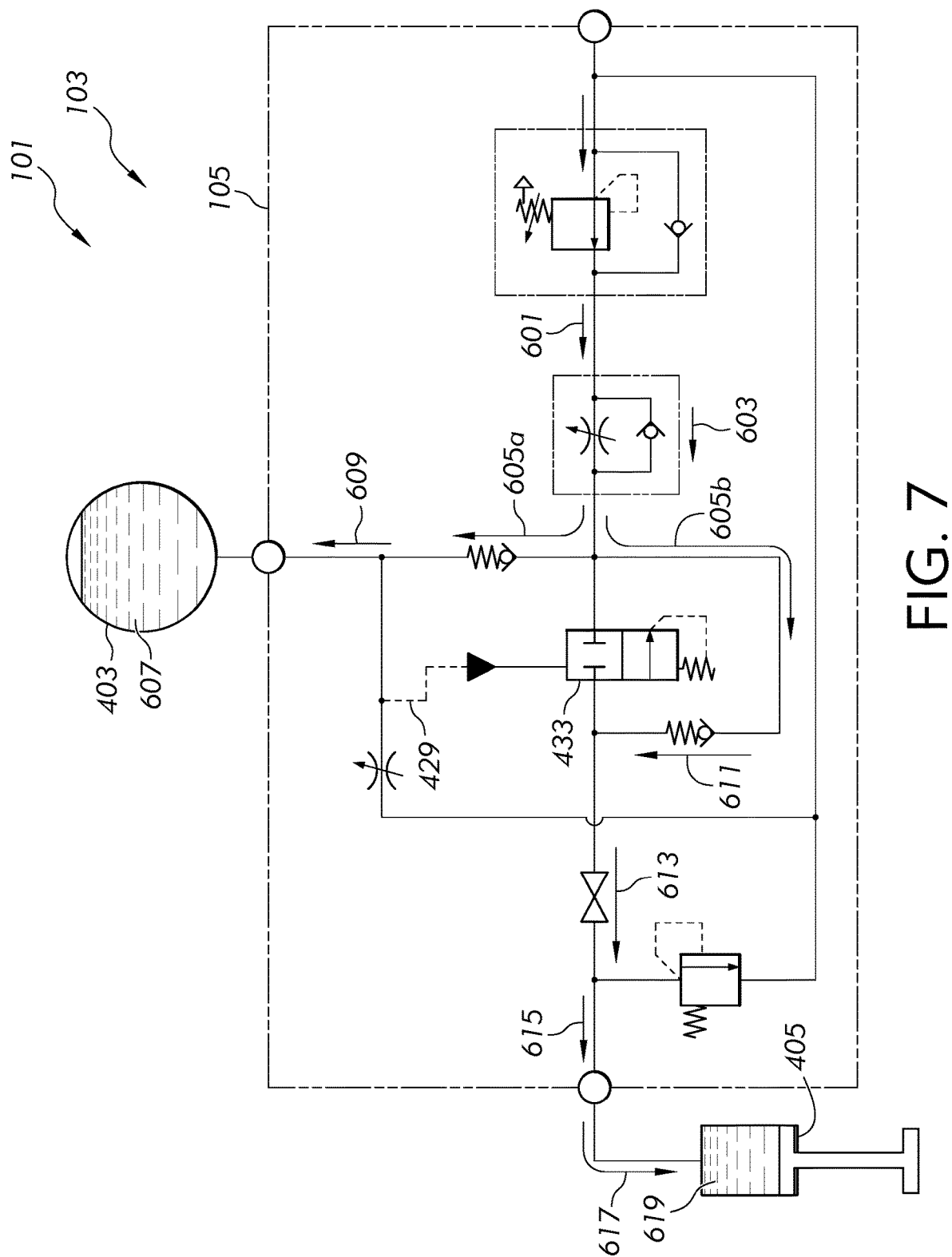
FIG. 7 schematically illustrates the example hydraulic flow schematic of FIG. 6 after charging the first hydraulic device.

A second hydraulic fluid flow of the two hydraulic fluid flows travels through the hydraulic communication line 423 as indicated by the second flow directional arrow 605b. The second hydraulic fluid flow can then travel through the check valve 421 as indicated by flow directional arrow 611. The second hydraulic flow then continues to travel through hydraulic communication lines 425, 427, 428 as indicated by flow directional arrows 613, 615, 617 wherein a first quantity of hydraulic fluid 619 from the hydraulic fluid source 115 charges the first hydraulic device 405. In the illustrated embodiment, the first hydraulic device 405 comprises the first hydraulic actuator and the charging of the first hydraulic device 405 comprises charging the first hydraulic actuator with the first quantity of hydraulic fluid 619. In some embodiments, the charging of the first hydraulic actuator can result in extension of a power link 621 in direction 623. Charging of the first hydraulic actuator can cause pivoting of the grapple 501 in the pivot direction 507 about the pivot axis 509. For example, as schematically illustrated by arrow 502 in FIG. 8, the first hydraulic actuator can be arranged between the grapple bracket 503 and the grapple 501 such that charging the first hydraulic actuator can pivot the grapple 501 relative to the grapple bracket 503 from a first position (see FIG. 5) wherein the opening 511 into the grapple 501 faces the first direction 515a (e.g. the direction of gravity) to a second position (see FIG. 8) wherein the opening 511 into the grapple 501 faces a second direction 515b extending at an angle "A" relative to the first direction 515a. In some embodiments, as shown the opening 511 into the grapple 501 faces the ground 523 in the first position. As can be seen in FIGS. 6 and 7, in some embodiments, the first hydraulic device 405 can be charged with the first quantity of hydraulic fluid 619 while charging the hydraulic accumulator 403 with the second quantity of hydraulic fluid 607.

Figure 9:
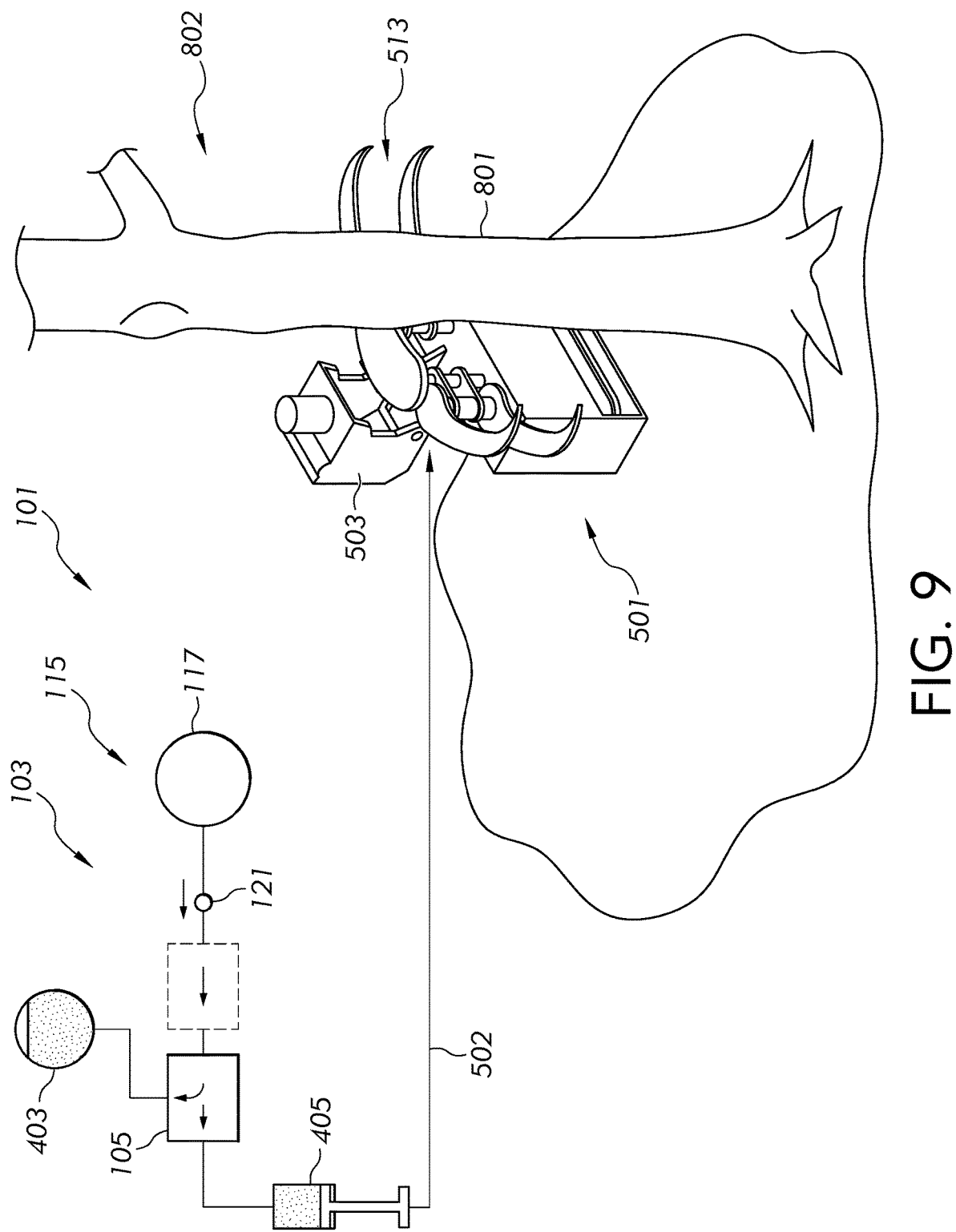
FIG. 9 schematically illustrate the grapple engaging the tree trunk.

Once the grapple 501 is fully pivoted to the desired position (e.g., see FIG. 8), the grapple 501 can be moved in to be seated against the tree trunk 801 of the tree 802 (e.g., see FIG. 9). The methods can include preventing further communication between the hydraulic fluid source 115 and the first hydraulic circuit 103. For example, with reference to FIG. 1, the hydraulic communication line 119 of the hydraulic fluid source 115 may be moved so that it does not communicate with the port 121 of the first hydraulic circuit 103 or the port 125 of the second hydraulic circuit 109. In further embodiments, as shown in FIG. 3, the force 301 can be applied to move the hydraulic communication line 119 of the hydraulic fluid source 115 out of communication with the port 121 of the first hydraulic circuit 103 and into communication with a port 125 of a second hydraulic circuit 109. Removing the hydraulic fluid source from further communication with the port 121 of the first hydraulic circuit 103 can prevent further hydraulic communication between the hydraulic fluid source 115 and the first hydraulic device 405 and to prevent further hydraulic communication between the hydraulic fluid source 115 and the hydraulic accumulator 403.

Figure 10:
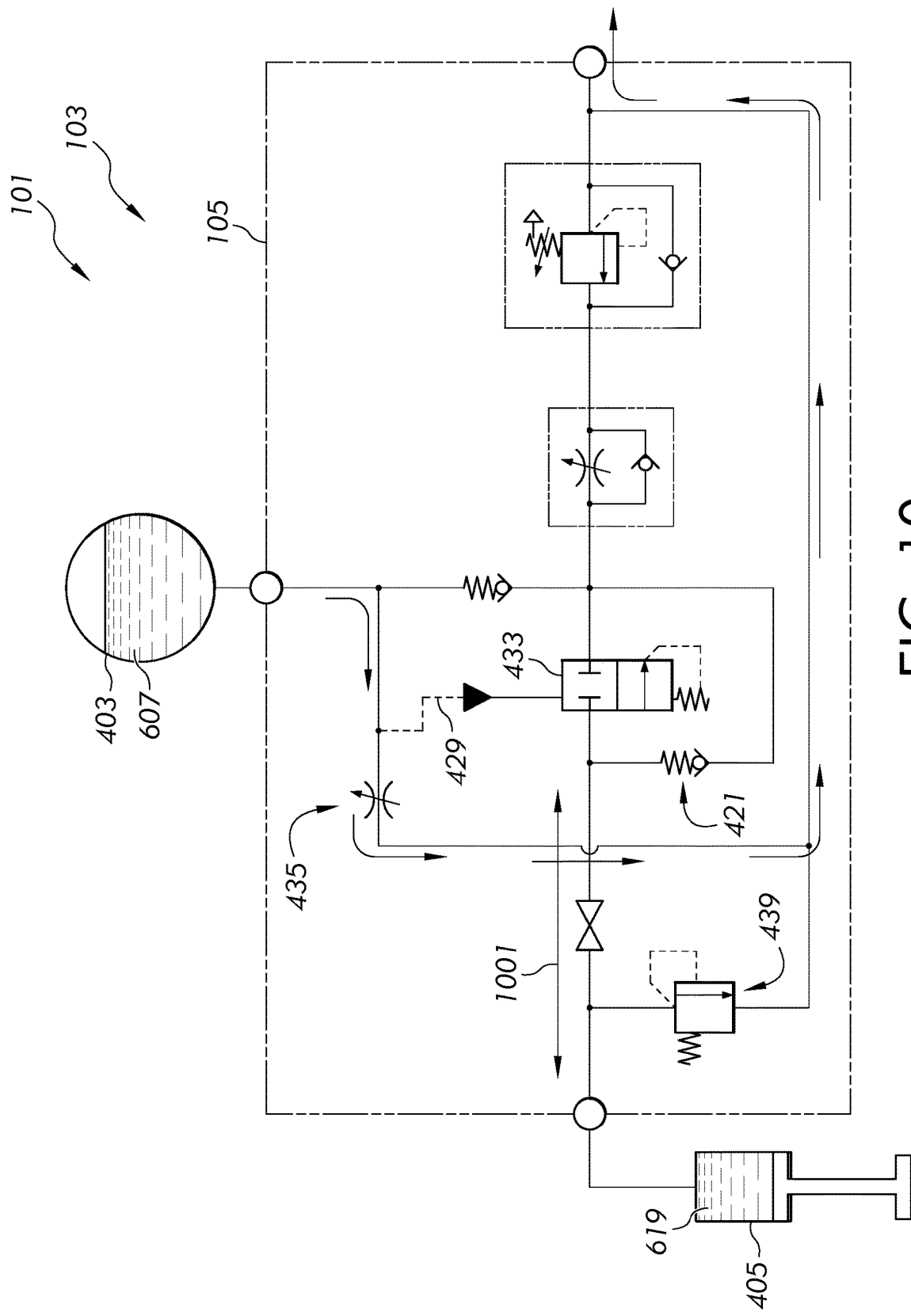
FIG. 10 schematically illustrates the example hydraulic flow schematic of FIG. 4 in a third flow orientation.
Figure 11:
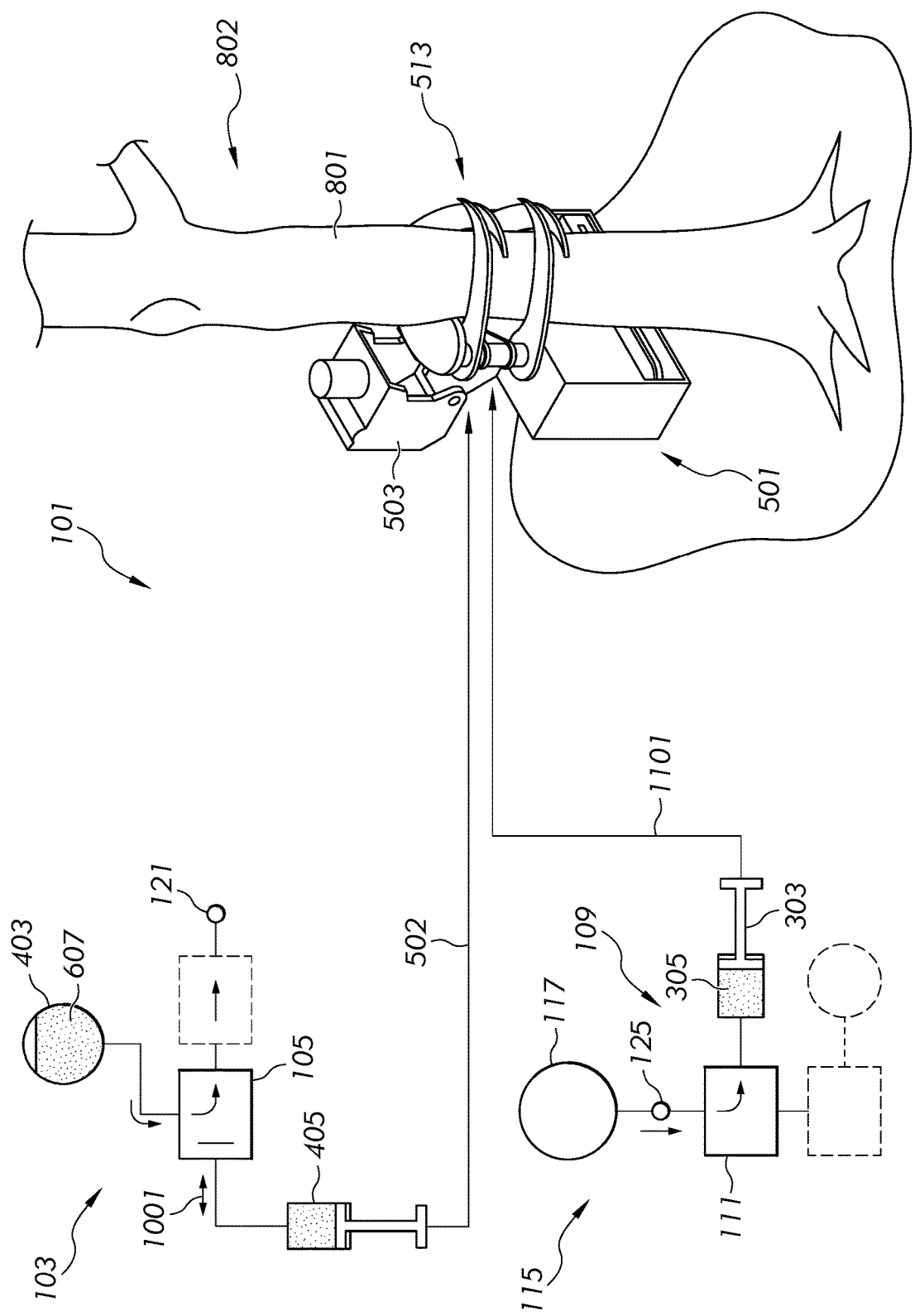
FIG. 11 schematically illustrates discharging of hydraulic fluid from the hydraulic accumulator in the third flow orientation while the hydraulic fluid source is placed in communication with the second hydraulic circuit to close jaws of the grapple to grip the tree trunk.

FIGS. 10-11 illustrate how the first quantity of hydraulic fluid 619 remains locked within the first hydraulic circuit 103 wherein the first quantity of hydraulic fluid 619 is trapped for a period of time to prevent discharging of the first quantity of hydraulic fluid 619 from the first hydraulic device 405 over the period of time. For example, referring to FIG. 10, the first quantity of hydraulic fluid 619 within the first hydraulic device 405 is locked as indicated by double arrow 1001 from exiting the first hydraulic circuit 103 by the closed pressure release valve 439, the closed orientation of the normally open hydraulic pilot operated control valve 433, and the check valve 421. Hydraulic pressure within the control segment 429 is maintained by the second quantity of hydraulic fluid 607 in the hydraulic accumulator 403. However, as indicated, the second quantity of hydraulic fluid 607 discharging from the hydraulic accumulator 403 reduces the rate that the hydraulic pressure within the control segment 429 decreases. Indeed, discharging the second quantity of hydraulic fluid 607 from the hydraulic accumulator 403 over the period of time maintains the hydraulic pressure within the control segment 429 at greater than or equal to the actuation pressure to maintain the normally open hydraulic pilot operated control valve 433 in the closed orientation to continue locking the first quantity of hydraulic fluid 619 from passing through the port 121 to exit the first hydraulic circuit 103 during the period of time. The flow control valve 435 can be adjusted to increase or decrease the rate that the second quantity of hydraulic fluid 607 discharges from the hydraulic accumulator 403 thereby changing the period of time before the normally open hydraulic pilot operated control valve 433 moves from the closed orientation back to the open orientation in response to the hydraulic pressure within the control segment 429 dropping below the actuation pressure. For example, the flow control valve 435 can be adjusted to reduce the flow rate through the valve and thereby increase the time until the normally open hydraulic pilot operated control valve 433 moves to the open orientation in response to the hydraulic pressure within the control segment 429 dropping below the actuation pressure. In further examples, the flow control valve 435 can be adjusted to increase the flow rate through the valve and thereby reduce the time until the normally open hydraulic pilot operated control valve 433 moves to the open orientation.

Discharging the second quantity of hydraulic fluid 607 from the hydraulic accumulator 403 over the period of time delays pivoting of the grapple 501 from the second position (see FIG. 8) back toward the first position (see FIG. 5) during the period of time. Delaying pivoting over the period of time permits proper orientation of the grapple 501 (in the second position) with respect to the tree trunk 801 and maintenance of the proper orientation over the period of time while the jaws 513 have time to grasp the tree trunk 801 (see FIG. 11) without undesired premature pivoting of the grapple 501 back toward the first position (see FIG. 5) that may interfere with proper grasping of the tree trunk 801 with the jaws 513.

In some embodiments, the hydraulic fluid source 115 may be placed in communication with a second hydraulic circuit 109 after the preventing further communicating between the hydraulic fluid source 115 and the first hydraulic circuit 103. For example, as shown in FIG. 3, the force 301 can be applied to the hydraulic fluid source 115 to place the hydraulic communication line 119 in communication with the port 125 of the second hydraulic circuit 109 without further communication with the port 121 of the first hydraulic circuit 103. As shown in FIG. 3, the hydraulic fluid source 115 can charge a second hydraulic device 303 of the second hydraulic circuit 109 with a third quantity of hydraulic fluid 305 (see FIG. 11) from the hydraulic fluid source 115 during the delay and while the hydraulic fluid source 115 is in communication with the second hydraulic circuit 109. As the hydraulic communication line 119 is in communication with the port 125 of the second hydraulic circuit 109 without further communication with the port 121 of the first hydraulic circuit 103, pressurizing the second hydraulic circuit 109 with the hydraulic fluid source 115 is carried out without further pressurizing the first hydraulic circuit 103 with the hydraulic fluid source 115. The second hydraulic device 303 of the second hydraulic circuit 109 can be charged with a third quantity of hydraulic fluid 305 from the hydraulic fluid source 115 during at least a portion of a period of time that the second quantity of hydraulic fluid 607 is discharged from the hydraulic accumulator 403. As shown in FIG. 10, as the hydraulic accumulator 403 is discharging the second quantity of hydraulic fluid 607 during the period of time, the hydraulic pressure within the control segment 429 is maintained at greater than or equal to the actuation pressure to maintain the normally open hydraulic pilot operated control valve 433 in the closed orientation to continue locking the first quantity of hydraulic fluid 619 from passing through the port 121 to exit the first hydraulic circuit 103 during the period of time.

In some embodiments, the second hydraulic device 303 can comprise the illustrated a second hydraulic actuator and the charging the second hydraulic device 303 comprises charging the second hydraulic actuator with the third quantity of hydraulic fluid 305. As schematically illustrated by arrow 1101, in some embodiments, the second hydraulic device 303 (e.g., second hydraulic actuator) can be incorporated as part of the grapple 501 and designed to close the jaws 513 of the grapple 501 from the open orientation illustrated in FIG. 9 to the closed orientation shown in FIG. 11 where, in some embodiments, the jaws 513 can securely grip the tree trunk 801. Although not shown, in some embodiments, the second hydraulic device can comprise the upstream hydraulic device 519 wherein the second hydraulic device 303 and the upstream hydraulic device 519 comprise a single hydraulic device rather than the illustrated two distinct hydraulic devices. For example, the upstream hydraulic device 519 can comprise the upstream hydraulic actuator where pressurized hydraulic fluid may charge a first chamber on one side of a piston of the hydraulic actuator to apply force in one direction while second hydraulic device of the second hydraulic circuit 109 can comprise the same upstream hydraulic device 519 wherein pressurized hydraulic fluid form the second hydraulic circuit 109 may charge a second chamber on an opposite side of the piston to apply force in a second direction opposite to the first direction. Thus charging the upstream hydraulic device 519 with pressurized hydraulic fluid from the first hydraulic circuit 103 can operate to open the jaws 513 of the grapple 501 as shown in FIG. 5, while charging the same hydraulic device with pressurized hydraulic fluid from the second hydraulic circuit 109 can operate to close the jaws 513 of the grapple 501 as shown in FIG. 11.

As shown in FIG. 11, the jaws 513 of the grapple 501 can be closed by pressurizing the second hydraulic circuit 109 with the hydraulic fluid source 115 without further pressurizing the first hydraulic circuit 103 with the hydraulic fluid source 115. As such, closing of the jaws 513 of the grapple 501 can occur during at least a portion of period of time that the first quantity of hydraulic fluid 619 is locked within the first hydraulic device. As the first quantity of hydraulic fluid 619 is locked within the first hydraulic device 405 over the period of time, the correct pivoted orientation of the grapple 501 relative to the grapple bracket 503 in the second position can be maintained over the period of time to allow closing of the jaws 513 of the grapple 501 at least during a portion of the period of time. In some embodiments, gradual discharging of the second quantity of hydraulic fluid 607 from the hydraulic accumulator 403 (e.g., with or without the flow control valve 435) can lock the first quantity of hydraulic fluid 619 within the first hydraulic device 405 for a period of time that is sufficient to maintain the proper pivoted orientation of the grapple 501 relative to the grapple bracket 503 while the jaws 513 of the grapple 501 close by charging the second hydraulic device 303 (e.g., second hydraulic actuator) with the third quantity of hydraulic fluid 305 from the hydraulic fluid source 115. Better gripping of the tree trunk 801 of the tree 802 with the grapple 501 can thereby be achieved since the grapple can maintain the proper pivoted orientation while the jaws are closed.

Figure 12:
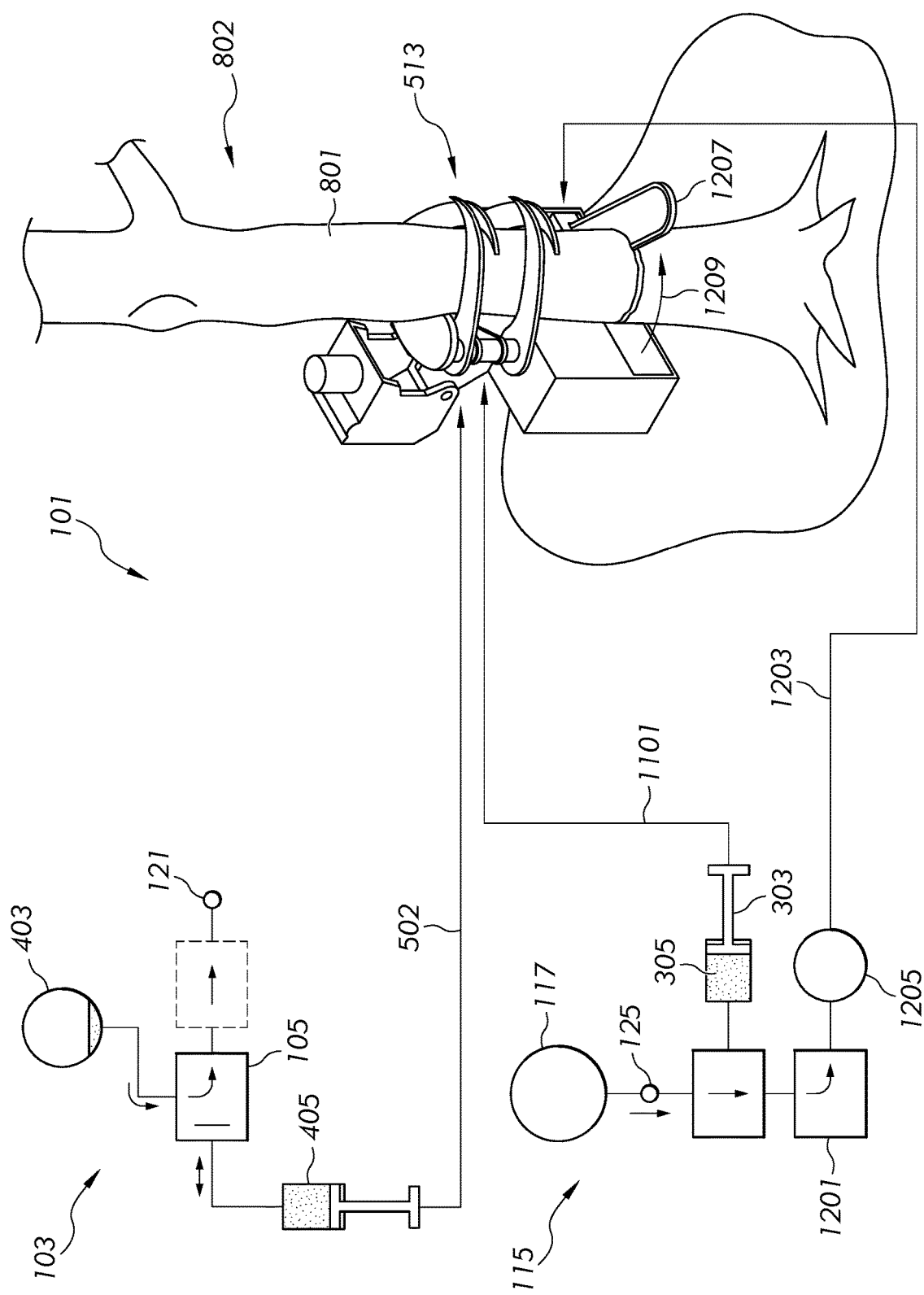
FIG. 12 schematically illustrates a hydraulic chain saw cutting the tree trunk after the jaws of the grapple have been closed to grip the tree trunk.

As shown in FIG. 12, the second hydraulic circuit 109 can optionally comprise downstream components 1201 that can carry out a downstream hydraulic function after charging the second hydraulic device 303. For example, as indicated by arrow 1203, a hydraulic power device 1205 can be incorporated into the grapple 501 to power a chain saw 1207. Once the jaws 513 have been closed by the second hydraulic device 303 to firmly grip the tree trunk 801, hydraulic fluid from the hydraulic fluid source 115 can supply pressurized hydraulic fluid to the hydraulic power device 1205 to activate the chain saw 1207 to pivot in direction 1209 while cutting through the tree trunk 801.

In some embodiments, the method can comprise unlocking the first quantity of hydraulic fluid 619 to permit exiting of the first quantity of hydraulic fluid 619 from the first hydraulic device 405 in response to dropping the hydraulic pressure within the control segment 429 below the actuation pressure after a delay of about 0.5 seconds or more from the preventing further communication between the hydraulic fluid source 115 and the first hydraulic circuit 103. In further embodiments, the delay may be from about 0.5 seconds to about 2 minutes, such as from about 0.5 seconds to about 1 minute, such as from about 1 second to 30 seconds, such as from about 2 seconds to about 30 second. Such a delay can permit partial or complete completion of one or more hydraulic functions carried out after locking the first quantity of hydraulic fluid 619 within the first hydraulic device 405. For example, the delay may be sufficiently long to permit partial or complete closing of the jaws 513 to allow the grapple 501 to grasp the trunk squarely (e.g., at a 90° angle) to permit appropriate gripping of the tree trunk 801 with the grapple and an appropriate cut by the chain saw 1207 (e.g. at a 90° angle) relative to the axis of the tree trunk 801. In further embodiments, the delay may be sufficiently long to permit complete closing of the jaws 513 and partial or complete cutting of the tree trunk 801 with the chain saw 1207.

Figure 13:
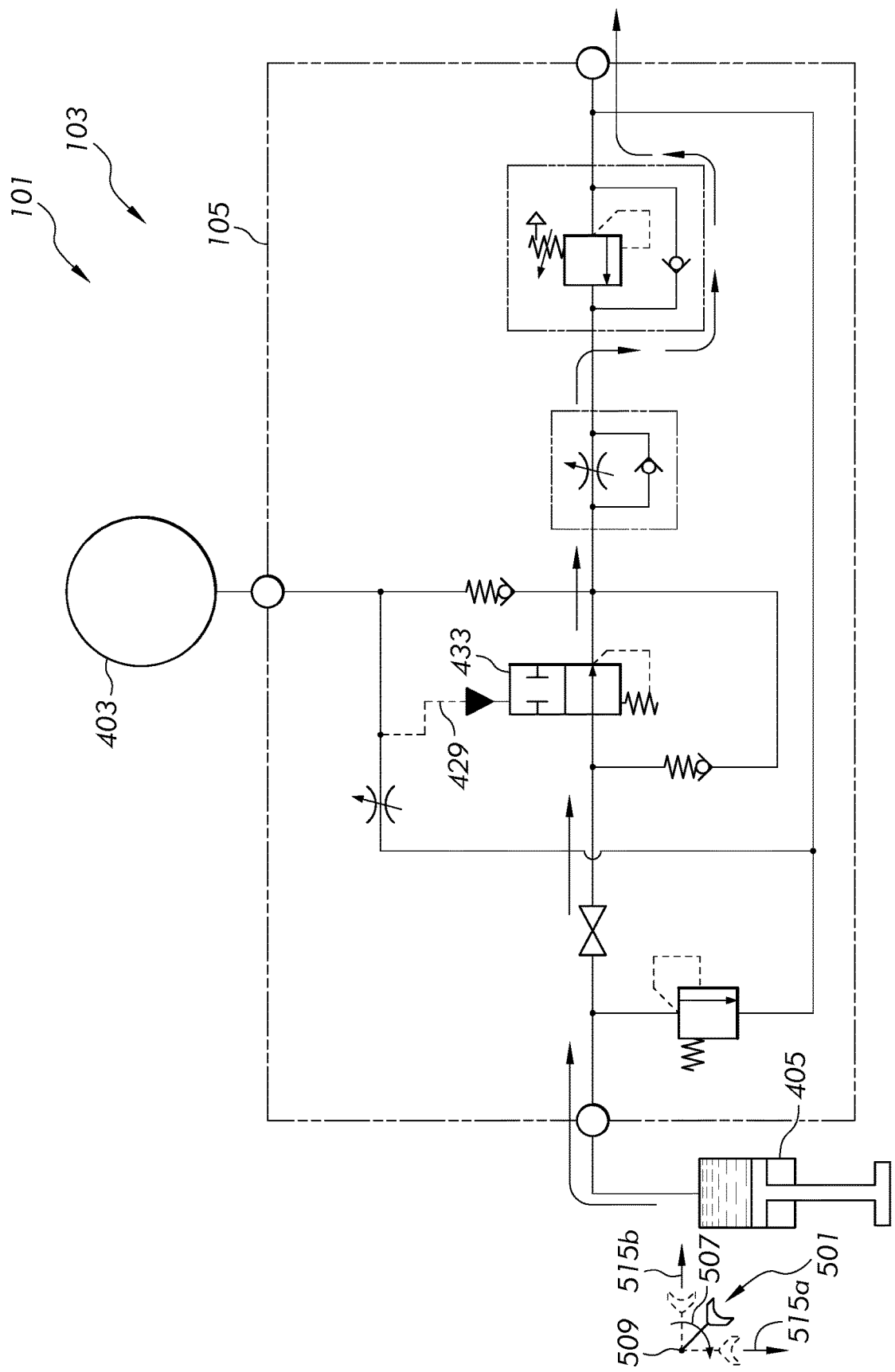
FIG. 13 schematically illustrates the example hydraulic flow schematic of FIG. 4 in a fourth flow orientation.
Figure 14:
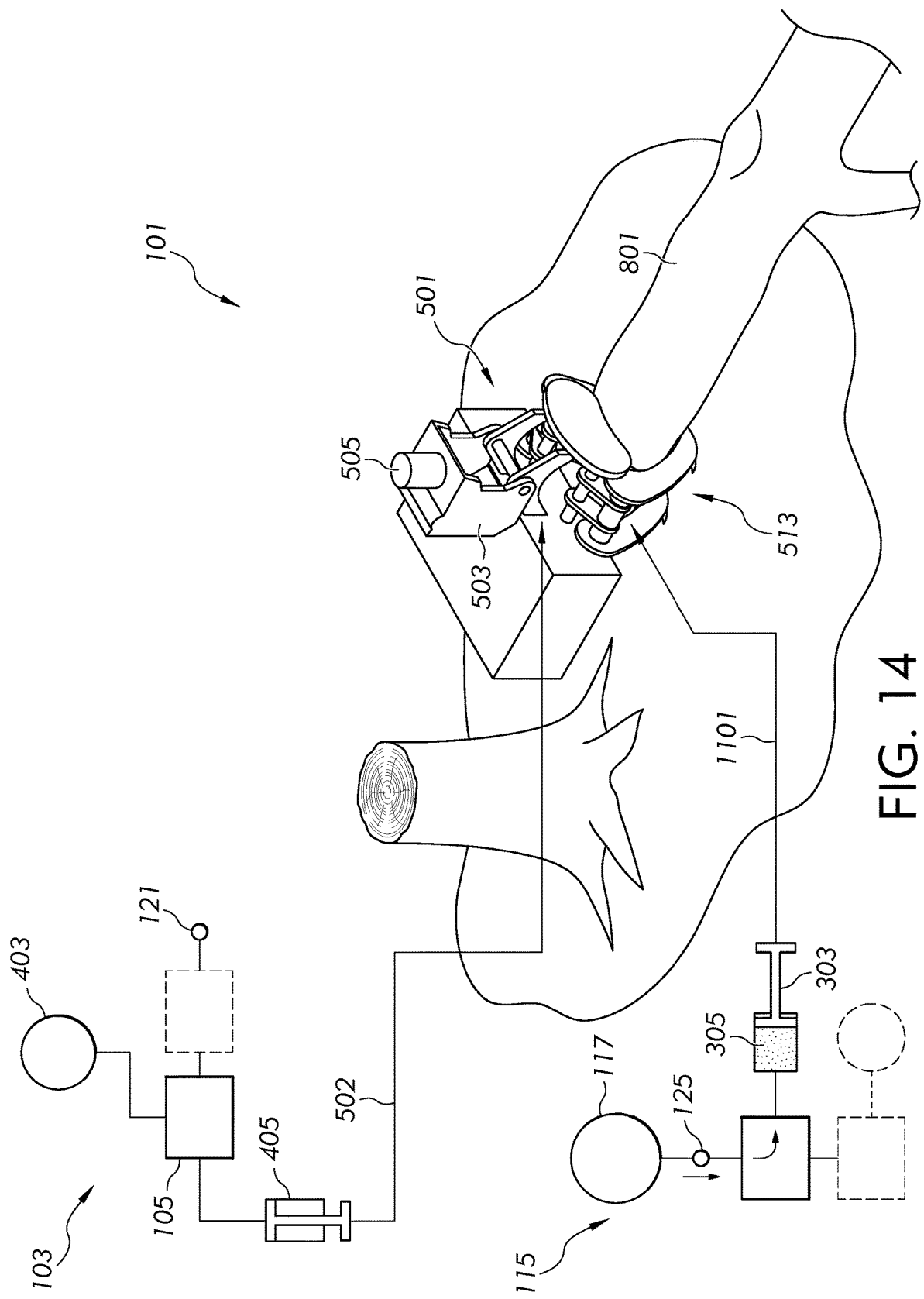
FIG. 14 schematically illustrates the first hydraulic device being discharged in the fourth orientation wherein the grapple has pivoted to support the severed tree trunk in a horizontal orientation.

As mentioned previously, unlocking the first quantity of hydraulic fluid 619 can permit the first quantity of hydraulic fluid 619 to pass though the port 121 and exit the first hydraulic circuit 103. In some embodiments, the unlocking can comprise hydraulically opening the normally open hydraulic pilot operated control valve 433 from the closed orientation shown in FIG. 8 to the open orientation shown in FIG. 13 in response to the hydraulic pressure within the control segment 429 dropping below the actuation pressure after the period of time. The unlocking can result in the grapple 501 pivoting from the second position shown in FIG. 12 back to the first position shown in FIG. 14. As shown, in the first position of FIG. 14, the second hydraulic device 303 may remain charged with the third quantity of hydraulic fluid 305 so that the jaws 513 continue to grip the tree trunk 801 while the tree trunk 801 is supported (e.g., at an inclined or horizontal orientation) and carried away by support arm 505.

The following are example embodiments of the disclosure with the understanding that further example embodiments may be provided in accordance with the disclosure. Furthermore, any of the embodiments discussed below may be used alone or in combination with any of the other embodiments discussed below.

Embodiment 1. Methods of the disclosure can comprise placing a hydraulic fluid source in communication a first hydraulic circuit and charging a first hydraulic device of the first hydraulic circuit with a first quantity of hydraulic fluid from the hydraulic fluid source. The methods can further comprise pressurizing a control segment of the first hydraulic circuit with the hydraulic fluid source to a hydraulic pressure greater than or equal to an actuation pressure. The methods can still further include locking the first quantity of hydraulic fluid from exiting the first hydraulic circuit in response to the hydraulic pressure within the control segment reaching greater than or equal to the actuation pressure. The methods can also include preventing further communication between the hydraulic fluid source and the first hydraulic circuit. Still further, the methods can include unlocking the first quantity of hydraulic fluid to permit exiting of the first quantity of hydraulic fluid from the first hydraulic device in response to dropping the hydraulic pressure within the control segment below the actuation pressure after a delay of about 0.5 seconds or more from the preventing further communication between the hydraulic fluid source and the first hydraulic circuit.

Embodiment 2. The method of embodiment 1, further comprising reducing a rate that the hydraulic pressure within the control segment decreases by discharging a second quantity of hydraulic fluid from a hydraulic accumulator.

Embodiment 3. The method of embodiment 2, wherein the hydraulic accumulator is charged with the second quantity of hydraulic fluid while charging the first hydraulic device.

Embodiment 4. The method of any one of embodiments 1-3, wherein the locking comprises hydraulically closing a normally open hydraulic pilot operated control valve from an open orientation to a closed orientation in response to the hydraulic pressure within the control segment rising to greater than or equal to the actuation pressure.

Embodiment 5. The method of embodiment 4, wherein the unlocking comprises hydraulically opening the normally open hydraulic pilot operated control valve from the closed orientation to the open orientation in response to the hydraulic pressure within the control segment dropping below the actuation pressure.

Embodiment 6. The method of any one of embodiments 1-3, wherein the unlocking comprises hydraulically opening a normally open hydraulic pilot operated control valve from a closed orientation to an open orientation in response to the hydraulic pressure within the control segment dropping below the actuation pressure.

Embodiment 7. The method of any one of embodiments 1-6, wherein the first hydraulic device comprises a first hydraulic actuator and the charging of the first hydraulic device comprises charging the first hydraulic actuator with the first quantity of hydraulic fluid.

Embodiment 8. The method of embodiment 7, wherein charging the first hydraulic actuator pivots a grapple from a first position wherein an opening into the grapple faces a first direction to a second position wherein the opening into the grapple faces a second direction extending at an angle relative to the first direction.

Embodiment 9. The method of embodiment 8, wherein the unlocking results in the grapple pivoting from the second position back toward the first position.

Embodiment 10. The method of any one of embodiments 8-9, wherein the opening into the grapple faces ground in the first position.

Embodiment 11. The method of any one of embodiments 1-10, further comprising placing the hydraulic fluid source in communication with a second hydraulic circuit after the preventing the further communicating between the hydraulic fluid source and the first hydraulic circuit.

Embodiment 12. The method of embodiment 11, further comprising charging a second hydraulic device of the second hydraulic circuit with a third quantity of hydraulic fluid from the hydraulic fluid source during the delay and while the hydraulic fluid source is in communication with the second hydraulic circuit.

Embodiment 13. The method of embodiment 12, wherein the second hydraulic device comprises a second hydraulic actuator and the charging the second hydraulic device comprises charging the second hydraulic actuator with the third quantity of hydraulic fluid.

Embodiment 14. The method of embodiment 13, wherein charging the second hydraulic actuator closes jaws of the grapple.

Embodiment 15. Methods can comprise placing a hydraulic fluid source in communication with a port of a first hydraulic circuit and charging a first hydraulic device of the first hydraulic circuit with a first quantity of hydraulic fluid entering the port from the hydraulic fluid source. The methods can further comprise charging a hydraulic accumulator of the first hydraulic circuit with a second quantity of hydraulic fluid entering the port from the hydraulic fluid source. The methods can further comprise pressurizing a control segment of the first hydraulic circuit with the hydraulic fluid source to a hydraulic pressure greater than or equal to an actuation pressure and locking the first quantity of hydraulic fluid from passing through the port to exit the first hydraulic circuit. The locking can comprise hydraulically closing a normally open hydraulic pilot operated control valve from an open orientation to a closed orientation in response to the hydraulic pressure within the control segment reaching greater than or equal to the actuation pressure. The methods can further comprise removing the hydraulic fluid source from further communication with the port to prevent further hydraulic communication between the hydraulic fluid source and the first hydraulic device and to prevent further hydraulic communication between the hydraulic fluid source and the hydraulic accumulator. The methods can further comprise discharging the second quantity of hydraulic fluid from the hydraulic accumulator over a period of time to maintain the hydraulic pressure within the control segment at greater than or equal to the actuation pressure to maintain the normally open hydraulic pilot operated control valve in the closed orientation to continue locking the first quantity of hydraulic fluid from passing through the port to exit the first hydraulic circuit during the period of time. The methods can further comprise unlocking the first quantity of hydraulic fluid to permit the first quantity of hydraulic fluid to pass though the port and exit the first hydraulic circuit. The unlocking can comprise hydraulically opening a normally open hydraulic pilot operated control valve from a closed orientation to an open orientation in response to the hydraulic pressure within the control segment dropping below the actuation pressure after the period of time.

Embodiment 16. The method of embodiment 15, wherein the first hydraulic device comprises a first hydraulic actuator and the charging the first hydraulic device comprises charging the first hydraulic actuator with the first quantity of hydraulic fluid.

Embodiment 17. The method of embodiment 16, wherein charging the first hydraulic actuator pivots a grapple from a first position wherein an opening into the grapple faces a first direction to a second position wherein the opening into the grapple faces a second direction extending at an angle relative to the first direction.

Embodiment 18. The method of embodiment 17, wherein unlocking the first quantity of hydraulic fluid results in the grapple pivoting from the second position back toward the first position.

Embodiment 19. The method of embodiment 18, wherein discharging the second quantity of hydraulic fluid from the hydraulic accumulator over the period of time delays pivoting of the grapple from the second position toward the first position during the period of time Embodiment 20. The method of any one of embodiments 17-19, wherein the opening into the grapple faces ground in the first position.

Embodiment 21. The method of any one of embodiments 17-20, further comprising closing jaws of the grapple by pressurizing a second hydraulic circuit with the hydraulic fluid source without further pressurizing the first hydraulic circuit with the hydraulic fluid source, wherein closing the jaws of the grapple occurs during at least a portion of the period of time.

Embodiment 22. The method of any one of embodiments 15-20, further comprising pressurizing a second hydraulic circuit with the hydraulic fluid source without further pressurizing the first hydraulic circuit with the hydraulic fluid source.

Embodiment 23. The method of embodiment 22, wherein a second hydraulic device of the second hydraulic circuit is charged with a third quantity of hydraulic fluid from the hydraulic fluid source during at least a portion of the period of time.

Embodiment 24. A hydraulic apparatus can comprise a control segment and a hydraulic accumulator in communication with the control segment. The hydraulic apparatus can further comprise a first hydraulic device and a normally open hydraulic pilot operated control valve in communication with the control segment. The normally open hydraulic pilot operated control valve can be configured to hydraulically lock the first hydraulic device in response to a hydraulic pressure within the control segment rising to greater than or equal to an actuation pressure Embodiment 25. The hydraulic apparatus of embodiment 24, further comprising a first flow control valve configured to control a discharge rate of hydraulic fluid from the hydraulic accumulator.

Embodiment 26. The hydraulic apparatus of any one of embodiments 24-25, further comprising a second flow control valve configured to control a discharge rate of hydraulic fluid from the first hydraulic device.

Embodiment 27. The hydraulic apparatus of any one of embodiments 24-26, wherein the first hydraulic device comprises a hydraulic actuator.

Embodiment 28. The hydraulic apparatus of embodiment 27, further comprising a grapple, wherein the hydraulic actuator is configured to pivot the grapple from a first position wherein an opening into the grapple faces a first direction to a second position wherein the opening into the grapple faces a second direction extending at an angle relative to the first direction.

It should be understood that while various embodiments have been described in detail with respect to certain illustrative and specific embodiments thereof, the present disclosure should not be considered limited to such, as numerous modifications and combinations of the disclosed features are possible without departing from the scope of the following claims.

What is claimed is:

1. A method comprising:
placing a hydraulic fluid source in communication with a first hydraulic circuit;
charging a chamber of a first hydraulic device of the first hydraulic circuit with a first quantity of hydraulic fluid from the hydraulic fluid source;
pressurizing a control segment of the first hydraulic circuit with the hydraulic fluid source to a hydraulic pressure greater than or equal to an actuation pressure;
locking the first quantity of hydraulic fluid from exiting the first hydraulic circuit in response to the hydraulic pressure within the control segment reaching greater than or equal to the actuation pressure;
preventing further communication between the hydraulic fluid source and the first hydraulic circuit; and
unlocking the first quantity of hydraulic fluid to permit exiting of the first quantity of hydraulic fluid from the chamber of the first hydraulic device in response to dropping the hydraulic pressure within the control segment below the actuation pressure after a delay of about 0.5 seconds or more from preventing further communication between the hydraulic fluid source and the first hydraulic circuit.

2. The method of claim 1, further comprising reducing a rate that the hydraulic pressure within the control segment decreases by discharging a second quantity of hydraulic fluid from a hydraulic accumulator.

3. The method of claim 2, wherein the hydraulic accumulator is charged with the second quantity of hydraulic fluid while charging the chamber of the first hydraulic device.

4. The method of claim 1, wherein locking of the first quantity of hydraulic fluid from exiting the first hydraulic circuit in response to the hydraulic pressure within the control segment reaching greater than or equal to the actuation pressure comprises hydraulically closing a normally open hydraulic pilot operated control valve from an open orientation to a closed orientation in response to the hydraulic pressure within the control segment rising to greater than or equal to the actuation pressure.

5. The method of claim 1, wherein the first hydraulic device comprises a first hydraulic actuator comprising the chamber and the charging of the chamber of the first hydraulic device comprises charging the chamber of the first hydraulic actuator with the first quantity of hydraulic fluid.

6. The method of claim 5, wherein charging the first hydraulic actuator pivots a grapple from a first position wherein an opening into the grapple faces a first direction to a second position wherein the opening into the grapple faces a second direction extending at an angle relative to the first direction.

7. The method of claim 1, further comprising placing the hydraulic fluid source in communication with a second hydraulic circuit after preventing the further communication between the hydraulic fluid source and the first hydraulic circuit.

8. The method of claim 7, further comprising charging a chamber of a second hydraulic device of the second hydraulic circuit with a third quantity of hydraulic fluid from the hydraulic fluid source during the delay and while the hydraulic fluid source is in communication with the second hydraulic circuit.

9. The method of claim 8, wherein the second hydraulic device comprises a second hydraulic actuator comprising the chamber of the second hydraulic device and charging of the second hydraulic device comprises charging the chamber of the second hydraulic actuator with the third quantity of hydraulic fluid.

10. The method of claim 9, wherein charging the second hydraulic actuator closes jaws of a grapple.

11. A method comprising:
placing a hydraulic fluid source in communication with a port of a first hydraulic circuit;
charging a chamber of a first hydraulic device of the first hydraulic circuit with a first quantity of hydraulic fluid entering the port from the hydraulic fluid source;
charging a hydraulic accumulator of the first hydraulic circuit with a second quantity of hydraulic fluid entering the port from the hydraulic fluid source;
pressurizing a control segment of the first hydraulic circuit with the hydraulic fluid source to a hydraulic pressure greater than or equal to an actuation pressure;
locking the first quantity of hydraulic fluid from passing through the port to exit the first hydraulic circuit by hydraulically closing a normally open hydraulic pilot operated control valve from an open orientation to a closed orientation in response to the hydraulic pressure within the control segment reaching greater than or equal to the actuation pressure;
removing the hydraulic fluid source from further communication with the port to prevent further hydraulic communication between the hydraulic fluid source and the chamber of the first hydraulic device and to prevent further hydraulic communication between the hydraulic fluid source and the hydraulic accumulator;
discharging the second quantity of hydraulic fluid from the hydraulic accumulator over a period of time to maintain the hydraulic pressure within the control segment at greater than or equal to the actuation pressure to maintain the normally open hydraulic pilot operated control valve in the closed orientation to continue locking the first quantity of hydraulic fluid from passing through the port to exit the first hydraulic circuit during the period of time;
unlocking the first quantity of hydraulic fluid to permit the first quantity of hydraulic fluid to pass though the port and exit the first hydraulic circuit by hydraulically opening a normally open hydraulic pilot operated control valve from a closed orientation to an open orientation in response to the hydraulic pressure within the control segment dropping below the actuation pressure after the period of time.

12. The method of claim 11, wherein the first hydraulic device comprises a first hydraulic actuator comprising the chamber and the charging of the chamber of the first hydraulic device comprises charging the chamber of the first hydraulic actuator with the first quantity of hydraulic fluid.

13. The method of claim 12, wherein charging the first hydraulic actuator pivots a grapple from a first position wherein an opening into the grapple faces a first direction to a second position wherein the opening into the grapple faces a second direction extending at an angle relative to the first direction.

14. The method of claim 13, wherein unlocking the first quantity of hydraulic fluid results in the grapple pivoting from the second position back toward the first position.

15. The method of claim 14, wherein discharging the second quantity of hydraulic fluid from the hydraulic accumulator over the period of time delays pivoting of the grapple from the second position toward the first position during the period of time.

16. The method of claim 13, further comprising closing jaws of the grapple by pressurizing a second hydraulic circuit with the hydraulic fluid source without further pressurizing the first hydraulic circuit with the hydraulic fluid source, wherein closing the jaws of the grapple occurs during at least a portion of the period of time.

17. The method of claim 11, further comprising pressurizing a second hydraulic circuit with the hydraulic fluid source without further pressurizing the first hydraulic circuit with the hydraulic fluid source.

18. A hydraulic apparatus comprising:
a control segment;
a hydraulic accumulator in communication with the control segment;
a first hydraulic device comprising a chamber; and
a normally open hydraulic pilot operated control valve in communication with the control segment and configured to hydraulically lock the first hydraulic device in response to a hydraulic pressure within the control segment rising to greater than or equal to an actuation pressure.

19. The hydraulic apparatus of claim 18, wherein the first hydraulic device comprises a hydraulic actuator comprising the chamber.

20. The hydraulic apparatus of claim 19, further comprising a grapple, wherein the hydraulic actuator is configured to pivot the grapple from a first position wherein an opening into the grapple faces a first direction to a second position wherein the opening into the grapple faces a second direction extending at an angle relative to the first direction.

* * * * *